Dec. 9, 1952  E. J. JOBLING-PURSER ET AL  2,620,598
METHOD OF FABRICATING MULTICOMPONENT GLASS ARTICLES
Filed April 20, 1948
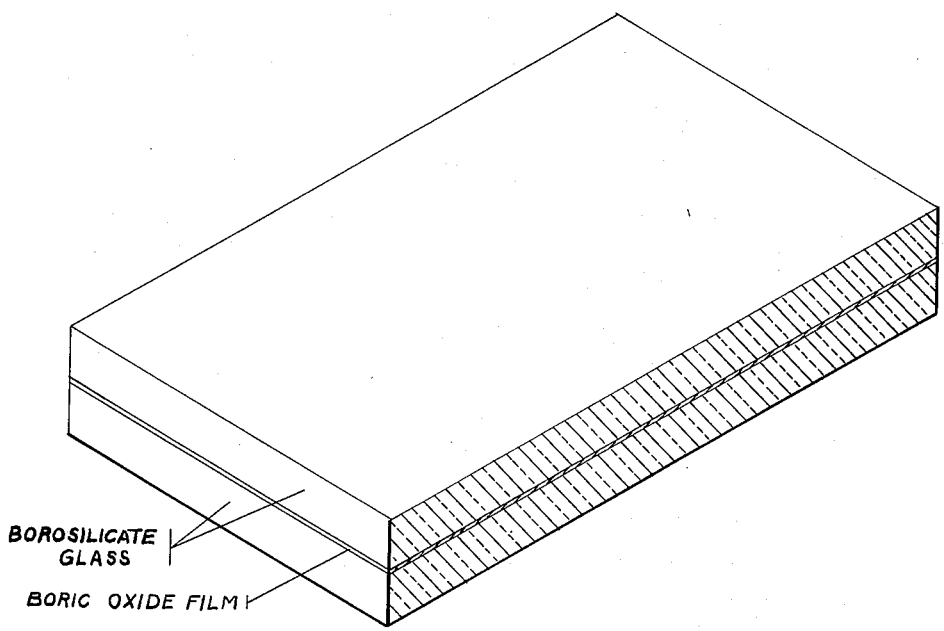
BOROSILICATE GLASS
BORIC OXIDE FILM
INVENTORS.
ERNEST JOSEPH JOBLING-PURSER
SHAUN MATURIN COX
BY PETER LINLEY KIRBY
KENNETH ALEXANDER MURDOCH
*Haseltine, Lake & Co.*
AGENTS Patented Dec. 9, 1952

2,620,598

UNITED STATES PATENT OFFICE 2,620,598

METHOD OF FABRICATING MULTI-COMPONENT GLASS ARTICLES

Ernest Joseph Jobling-Purser, Sunderland, Shaun Maturin Cox, Durham, and Peter Linley Kirby and Kenneth Alexander Murdoch, Sunderland, England, assignors to James A. Jobling and Company Limited, Sunderland, England, a British company Application April 20, 1948, Serial No. 22,246 In Great Britain April 22, 1947

5 Claims. (Cl. 49—82)

The invention relates to a method of fabricating multi-component glass articles, the invention being based on discoveries arising out of work undertaken to overcome troubles encountered when working glass, in particular that known as "Pyrex" brand glass, at elevated temperatures.

When it is proposed to join together a number of glass parts by placing them in contact and heating until the contacting parts seal together, it is found necessary to work in a temperature range such that the viscosity of the glass is between $10^{12}$ and $10^{4.6}$ poises (e. g. in the case of "Pyrex" brand glass between 600° and 1100° C.) because lower temperatures will not give a satisfactory joint and at higher temperatures the parts are liable to lose their shape.

With certain kinds of hard glass, including "Pyrex" brand glass, it is found in general that, under the effect of heating for a prolonged period within the temperature range mentioned, devitrification takes place at the surfaces to be joined, preventing the successful application of such a technique.

A technique sometimes practised for the manufacture of shapes in glass not easily moulded by normal glass-house methods, is to crush the glass and mould it with a bond at room temperature, thereafter heating it until it sinters and fuses into a more or less solid mass. With some glasses, however (and "Pyrex" brand glass is one of them) the co-efficient of thermal expansion is increased by this sintering. We have investigated this increase and found that it is also due to surface devitrification.

In short, it can be said that in many processes in which it is required to heat glass at elevated temperatures for prolonged times, such treatment is found to have its limitations because of the devitrification of the glass. Devitrification connotes the formation of crystalline precipitates whose presence is undesirable because of the disruption of the otherwise substantial homogenity of the material with consequent deterioration in strength, appearance and other characteristics. It is a well-known physical fact that the occurrence of these precipicates is frequently dependent on the presence of some discontinuity or nucleus in the glass from which the crystals may grow and that without such centres for growth the precipitation may be greatly allayed.

It is also known that in many glasses the surface of the glass itself may provide the nuclei so that, the glass being homogeneous, the growth of crystals may proceed entirely from the surface.

The present invention arises from the discovery that the efficacy of the surface in providing nuclei can be reduced by treatment of the surface. The practice of this invention makes possible the satisfactory sealing of glass parts in contact at temperatures which, while the glass is soft enough to seal, leave the parts still rigid enough to be substantialy self-supporting, when without the practice of the invention the development of surface devitrification along those surfaces supposed to seal together precludes the possibility of a satisfactory seal.

As an example, borosilicate glasses of composition 80% $SiO_2$, 12% $B_2O_3$, 5% $R_2O$, and 2.5% $Al_2O_3$, where R is an alkali metal, have many useful applications attributable to their low coefficient of thermal expansion. If, however, the glass is heated for a prolonged time at temperatures above 600° but below 1070° C., a proportion of the silica crystallizes from nuclei in one of the forms of crystalline silica—usually cristobalite or tridymite. Now these crystals, besides having thermal expansion coefficients greater than the glass, undergo modifications involving large volumetric changes when cooled to room temperature, so that the presence of these crystals destroys to a marked extent the desired attribute of low thermal expansion in the material as a whole. It has been found that devitrification in this glass proceeds almost exclusively from the surface. When devitrification occurs in the body of the glass, the nuclei are in any case so far apart that the internal devitrification does not form a continuous flow but rather each crystal group, usually of spheroidal shape, contracts and breaks away so that its effect upon the strength of the structure is similar to that of a bubble. On the untreated surface, the nuclei are so numerous that devitrification develops as a continuous film.

As a result of experiments, we have found that this development of devitrification as a film occurs even if the surface is coated with molten glass before being subjected to the heat treatment which produces devitrification; that is to say, devitrification develops along the interface substantially as if the interface consisted of two exposed surfaces. In any glass structure, containing such interface, which requires to be heated for a prolonged time at temperatures where devitrification occurs, the strength is greatly reduced and the coefficient of thermal expansion in the region of the interface is greater than that for the bulk of the glass.

We have discovered, and in this resides our invention, that certain substances, when spread over the surface to be joined, hinder or completely stop the devitrification of this surface during the subsequent heating.

A suitable substance is, according to the results of our experiments, one which would have the property of reducing the liquidus temperature if added as a constituent of the glass batch.

A structure, containing interfaces which have been pretreated with a film of such a substance before sealing, does not suffer from the weakness referred to above—or does so to a lesser degree. Evidently the function of the film is to graduate the discontinuity, the existence of which is indicated by the formation of crystalline material on the interfaces of untreated seals. In the absence of such discontinuity, no nuclei are available for crystal formation.

The chief requirement in the application of the film is that it should thoroughly cover the surface and, provided this requirement is met, the film may be of such slight thickness that it does not of itself contribute to any discernable extent to either the strength or the thermal expansion coefficient of the structure as a whole.

In the case of the borosilicate glass above referred to, it has been found that a thin film of boric oxide less than $\frac{1}{10}$ of a millimetre in thickness is sufficient to completely suppress the interfacial devitrification, provided the surface is thoroughly covered.

A satisfactory method of applying the film is by spraying the surface with an ester of boric acid or a solution of an ester in a suitable medium, e. g. propyl borate, or a 25% solution of n-propyl borate in anhydrous methyl alcohol. The film is allowed to hydrolyse in slightly humid air.

Another method of applying the film which we have found to be of value where intricate parts are to be treated, is to introduce the cool part into a warm chamber containing the vapour of (say) n-propyl borate, the part being withdrawn when sufficient vapour is condensed on to this cold surface.

Alumina is found to behave in a like manner, although in practice it is less desirable, partly because of the difficulty in applying a suitable film and partly because the subsequent sealing is less rapid than in the case of boric oxide.

One preferred embodiment of the present invention is illustrated by the single figure of the accompanying drawing.

Particulars of a practical application of the invention are given below:

A number of optical flats of "Pyrex" brand glass were sprayed with a 25% (by volume) solution of n-propyl borate in dry methyl alcohol. The thickness of the film was controlled by varying the duration of the spray, and was calculated by weighing the flats before and after treatment. After the film had been allowed to hydrolyse, a similar clean flat was laid on top as illustrated in the accompanying drawing and the sandwiches so formed were heated for 17 hours at 800° C. When the glasses had cooled, the interface was examined microscopically and the number of crystalline centres per square millimetre counted. The crystalline material was evidently spheroidal cristobalite, and each spheroid was assumed to correspond to the initial presence of a centre or nucleus for crystallization.

The following table shows the observed spheroid densities for the various calculated film thicknesses:

| Thickness of Film in mm. | Spheroid population density |
|---|---|
| 0 | 1600 |
| $2.05 \times 10^{-4}$ | 114.9 |
| $2.46 \times 10^{-4}$ | 11.2 |
| $4.5 \times 10^{-4}$ | 9.75 |
| $11.45 \times 10^{-4}$ | 6.6 |
| $26.6 \times 10^{-4}$ | 4.75 |
| $76.5 \times 10^{-4}$ | 1.3 |
| $116 \times 10^{-4}$ | 0 |

The procedure according to the invention is not only applicable when preformed components are being dealt with, but is also applicable when glass articles or components are to be formed by the sintering method, the particles of glass being coated with the devitrification inhibiting substance before sintering.

We claim:

1. A method of fabricating an article of borosilicate glass from pre-formed separate pieces which comprises the steps of forming a film on surfaces of the pieces which are to be fused together by applying a substance taken from the group consisting of boric oxide and materials which, under the action of heat, leave a residue which is substantially boric oxide, said film having a thickness of at least $2 \times 10^{-4}$ millimetres but not exceeding $1 \times 10^{-2}$ millimetres, arranging the pieces having said substance applied thereto in close juxtaposition, and then heating the preformed pieces to a temperature which causes them to fuse together to form said article but which does not exceed the liquidus temperature of the glass.

2. Method according to claim 1, wherein the surfaces to be joined are sprayed with an ester of boric acid to form the film.

3. Method according to claim 1, wherein the surfaces to be joined are sprayed with a solution of n-propyl borate in anhydrous methyl alcohol to form the film.

4. Method according to claim 1, wherein the film is allowed to hydrolyse in slightly humid air.

5. Method according to claim 1, wherein the pieces to be fused together are introduced in a cool state into a warm chamber containing the vapour of n-propyl borate, the pieces being withdrawn when sufficient vapour is condensed on the said pieces.

ERNEST JOSEPH JOBLING-PURSER.
SHAUN MATURIN COX.
PETER LINLEY KIRBY.
KENNETH ALEXANDER MURDOCH.

REFERENCES CITED

The following references are of record in the file of this patent:

UNITED STATES PATENTS

| Number | Name | Date |
|---|---|---|
| 519,186 | Hughes | May 1, 1894 |
| 1,565,598 | Sproesser | Dec. 15, 1925 |
| 2,065,852 | Dalton et al. | Dec. 29, 1936 |
| 2,238,777 | Lemmers et al. | Apr. 15, 1941 |

FOREIGN PATENTS

| Number | Country | Date |
|---|---|---|
| 455,460 | Great Britain | Oct. 21, 1936 |